Aug. 13, 1968    S. NORD    3,396,974
BELL AND SPIGOT PIPE JOINTS AND METHOD OF
SEALING AND LOCKING PIPE JOINTS
Original Filed Feb. 26, 1962
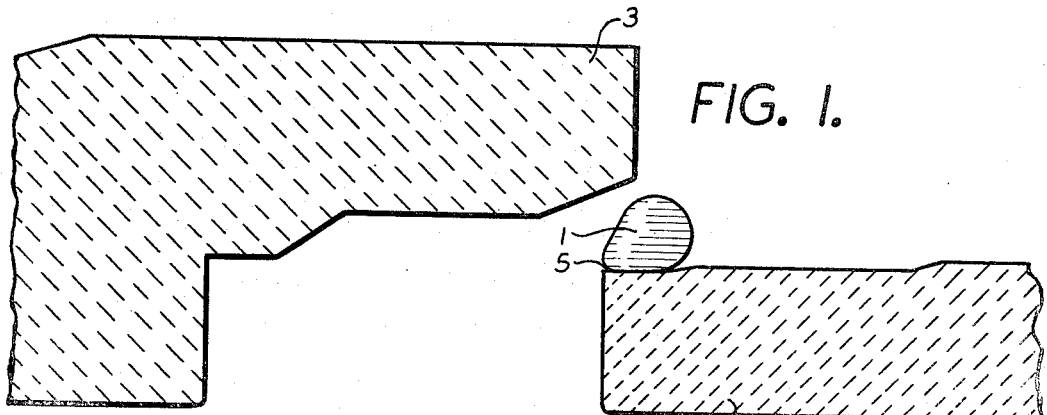
FIG. 1.
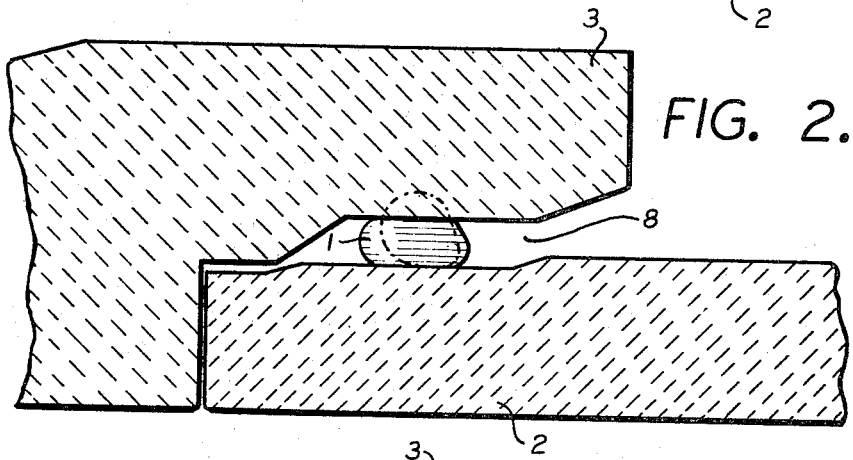
FIG. 2.
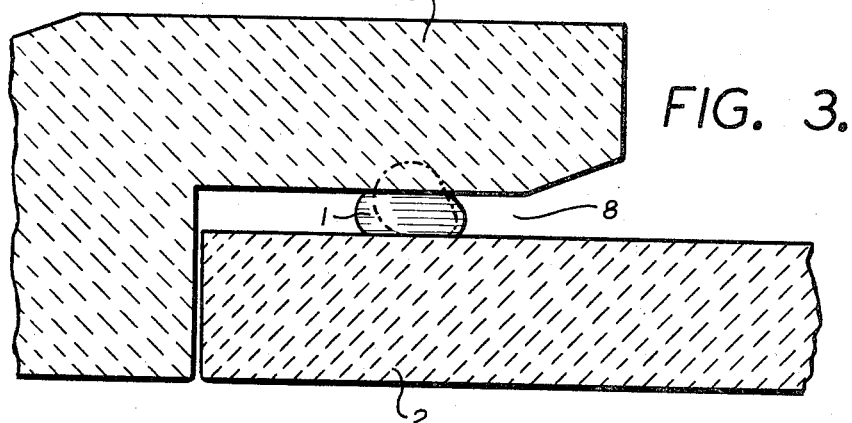
FIG. 3.
FIG. 4.
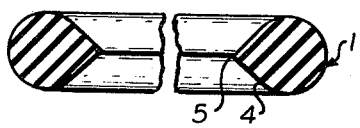
FIG. 5.
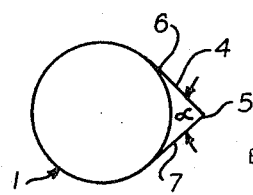
INVENTOR
STEN NORD
BY
BYERLY, TOWNSEND, WATSON + CHURCHILL
ATTORNEYS.

United States Patent Office 3,396,974
Patented Aug. 13, 1968

3,396,974
BELL AND SPIGOT PIPE JOINTS AND METHOD OF SEALING AND LOCKING PIPE JOINTS
Sten Nord, Finsta, Sweden, assignor to Forsheda Gummifabrik Aktiebolag, Forsheda, Sweden, a corporation of Sweden
Continuation of applications Ser. No. 175,554, Feb. 26, 1962, and Ser. No. 409,548, Nov. 6, 1964. This application Nov. 14, 1966, Ser. No. 594,260
Claims priority, application Sweden, Feb. 27, 1961, 2,040/61
3 Claims. (Cl. 277—9)

This application is a continuation of my earlier filed applications, Ser. No. 175,554, filed Feb. 26, 1962, and Ser. No. 409,548, filed Nov. 6, 1964, both now abandoned.

My invention relates to pipe joints. It aims to provide an improved joint of the bell and spigot type wherein a sealing ring of a flexible material such as rubber is employed to prevent leakage at the joint and an improved method of sealing and locking pipe joints.

In the past, when pipe lengths with mating ends of the bell and spigot type have been joined together, a ring of a flexible material such as rubber has been placed between the opposed surfaces of the bell and spigot to prevent leakage at the joint. This has been done in two ways, namely, by means of a sliding joint or by means of a rolling joint.

In the case of the sliding joint, a ring of sealing material was placed in a groove molded in the outer surface of the spigot or the inner surface of the bell and was designed to remain in such groove as the spigot was thrust into the bell to form the joint. To facilitate the sliding of the sealing ring over the surface of the ungrooved member, a lubricant was generally employed. The sliding type joints are subject to serious disadvantages. For instance, the molding operation necessary to form a groove for the sealing ring is costly; and the sealing ring is liable to become displaced from its groove with an attendant failure of the joint.

In the rolling type of joint, sealing rings of circular cross-section have been employed. Such a ring was stretched over the spigot and as the spigot was thrust home in its bell the ring was designed to roll along the opposed surfaces of the bell and spigot. In this type of joint, the expensive molding operation necessary to provide a groove for the sealing ring may be dispensed with but then considerable difficulty is encountered in properly positioning the ring on the spigot. The ring of circular cross-section tends to become twisted, it may not roll uniformly throughout its entire circumference and forces are created that tend to urge the pipe sections with which such a ring is employed away from each other. Furthermore, if the compression to which such a ring is subjected should be excessive, failure of the joint may result and there is no way in which persons assembling the pipe lengths with such a ring can tell whether satisfactorily sealed joints are being made.

I have discovered that it is possible to overcome the foregoing disadvantages in the creation of sealed pipe joints of the bell and spigot type by compressing between the bell and spigot, in a joint of the rolling type, a particular form of flexible sealing ring that has a cross-section which, while generally circular, includes a pointed integral projection whose sides are tangents to the circular cross-section of the sealing ring and, in the unstressed condition, extends inwardly from the inner periphery of the sealing ring. The flat surfaces that are provided by the converging sides of the projection on the sealing ring that I employ in the practice of my invention permit the creation of a superior locking type of seal and, surprisingly, do not interfere with ready, uniform rolling action of the sealing ring as pipe ends are joined and sealed therewith.

A sealing ring in the form that I now prefer to employ in the practice of my invention and a pipe joint sealed therewith are illustrated in the accompanying drawing in which:

FIG. 1 is a longitudinal cross-section of the spigot end of a concrete pipe showing the initial position of the sealing ring thereon;

FIG. 2 is a longitudinal cross-section of a joint made by thrusting the spigot illustrated in FIG. 1 into a mating bell;

FIG. 3 is a longitudinal cross-section of a simple joint between concrete pipes with a sealing ring provided therein;

FIG. 4 is a cross-section of a sealing ring in the unstressed state; and

FIG. 5 is a view theoretically illustrating the cross-section of the sealing ring.

The sealing ring 1 illustrated in the drawing is made of a flexible material such as rubber. It is adapted to hug the outer surface of the spigot end 2 of a length of pipe and to be compressed between that surface and the inner surface of the mating bell end 3 of a second length of pipe.

The sealing ring 1 is of at least substantially circular cross-section and, according to my invention, said cross-section has a preferably pointed integral projection 4 which is adapted to prevent turning or twisting of the sealing ring 1 in the sealing position illustrated in FIGS. 2 and 3.

As illustrated in FIG. 4, the pointed projection 4 in the unstressed state of sealing ring 1 is situated at the inner periphery of that sealing ring with the apex 5 lying in the middle plane of ring 1.

Theoretically, the pointed projection 4 is defined by two tangents 6 and 7 to the circular cross-section as shown in FIG. 5. The angle $\alpha$ at the apex 5 of the projection 4 is approximately 90°. However, the angle $\alpha$ can vary within broad limits and it should rather be somewhat less than 90°. In practice, the cross-section of the sealing ring 1 may be slightly rounded so as to have a teardrop shape.

In the unstressed state, the sealing ring 1 has an inner diameter slightly smaller than the outer diameter of the spigot 2 so that it has to be stretched in order to permit of its being placed on the spigot 2 before that spigot is inserted in the bell 3. Thus, when the outer diameter of the spigot 2 is 366 mm., the inner diameter of the sealing ring should be about 350 mm. The gap 8 between the opposed surfaces of the spigot 2 and the bell 3 is approximately two-thirds of the diameter of the circular cross-section of the sealing ring. Thus, when said diameter is 13.5 mm., the gap 8 shall be about 8.5 mm. Such dimensions permit sufficient compression of the sealing ring to effect a tight seal but not such excessive compression as may be detrimental to the pipe or sealing ring.

The operation of the sealing ring that I employ in the practice of my invention is as follows: sealing ring 1 is initially placed on spigot 2 adjacent its outer end so that the flat surface provided by one of the tangents 6 or 7 hugs the outer surface of spigot 2 and apex 5 is pointed toward the outer end of spigot 2. That spigot is then thrust home into its bell 3 so that the sealing ring 1 assumes its sealing position in the gap 8 between the bell 3 and spigot 2, which are arranged in concentric relative position. It is noteworthy that broad sealing surfaces of substantially the same length are then presented to the opposed surfaces of spigot 2 and bell 3. It is a further important feature of my invention that the flat surface that is provided by the uppermost tangent 7 or 6 when the sealing ring 1 is positioned on spigot 2 as illustrated in FIG. 1 provides an outwardly flaring guide which, through its contact with the mouth of bell 3, causes spigot 2 to be accurately centered in that bell. Appropriately centered pipe lengths can thus be joined and sealed with a minimum expenditure of time and effort.

As spigot 2 is thrust home in bell 3 the sealing ring 1 rolls between the opposed surfaces of the bell and spigot until apex 5 is pointed away from the outer end of spigot 2, as illustrated by the dotted lines in FIGS. 2 and 3. When apex 5 reaches this position a distinct snap is heard which assures the user that the joint between spigot 2 and bell 3 has been properly formed and the bell and spigot are then locked together so that considerable force is required to separate them. If the dimensions of the diameter of the circular cross-section of sealing ring 1 and the width of gap 8 are such that the sealing ring would be subjected to excessive compression in the position illustrated in FIGS. 2 and 3, the projection 4 offers so much resistance to rolling as an attempt is made to thrust spigot 2 home in bell 3 that the user is warned that correction should be made.

It is to be understood that the specific embodiment of my invention that I have described is illustrative and that the terms which have been used are terms of description and not of limitation. Accordingly, modifications may be made therein without departing from the spirit of my invention as it is defined in the appended claims. Thus, while the pipes illustrated in the drawing are described as made of concrete, it will be understood that pipes of the spigot and bell type made of material other than concrete may be joined and sealed in the practice of my invention.

What I claim is:
1. In a bell and spigot pipe joint of the class wherein a sealing ring of elastic material is compressed to a deformed state between the opposed substantially cylindrical surfaces of the bell and spigot by rolling said sealing ring along said surfaces into sealing position as the spigot is thrust into the bell until it is seated therein:

the combination with said bell and spigot of a sealing ring of elastic material of substantially circular cross-section whose inner diameter is less than the outer diameter of said spigot and which is provided with a pointed integral projection whose sides are tangents to the circular cross-section of the sealing ring and which extends inwardly from the inner periphery of said sealing ring in the unstressed state;

and wherein said projection points toward the inner end of the spigot so that a side of the projection lies along the outer surface of said spigot after the stressed sealing ring has been rolled into sealing position whereby the spigot is locked in said bell.

2. A bell and spigot pipe joint in accordance with claim 1, characterized by the fact that the apex of the pointed projection has an angle of about 90°.

3. A bell and spigot pipe joint in accordance with claim 1, characterized by the fact that said projection has a slightly rounded apex.

References Cited
UNITED STATES PATENTS 2,148,468  2/1939  Hothersall _____ 220—46

FOREIGN PATENTS 1,251,115  12/1960  France.
876,193  8/1961  Great Britain.

SAMUEL ROTHBERG, *Primary Examiner.*